US009171330B2

(12) United States Patent
Woods et al.

(10) Patent No.: US 9,171,330 B2
(45) Date of Patent: Oct. 27, 2015

(54) TRANSPARENCY DATA ANALYSIS AND REPORTING

(76) Inventors: Jonathan L. Woods, Coupeville, WA (US); David Kirby Rehr, Arlington, VA (US)

( * ) Notice: Subject to any disclaimer, the term of this patent is extended or adjusted under 35 U.S.C. 154(b) by 480 days.

(21) Appl. No.: 13/341,633

(22) Filed: Dec. 30, 2011

(65) Prior Publication Data
US 2013/0173652 A1    Jul. 4, 2013

(51) Int. Cl.
*G06F 17/30* (2006.01)
*G06Q 40/00* (2012.01)

(52) U.S. Cl.
CPC .......... *G06Q 40/00* (2013.01); *G06F 17/30424* (2013.01); *G06F 17/30522* (2013.01); *G06F 17/30554* (2013.01)

(58) Field of Classification Search
CPC .......... G06F 17/30545; G06F 11/3452; G06F 17/30554; G06F 11/3466; G06F 17/30539; G06F 2201/87; G06F 17/30522; G06F 17/30424; G06Q 10/06395; G06Q 20/4016; G06Q 30/02; G06Q 10/0639; H04L 43/08; H04L 43/16
USPC .......................................... 707/769, 687, 694
See application file for complete search history.

(56) References Cited

U.S. PATENT DOCUMENTS

| | | | |
|---|---|---|---|
| 6,384,844 B1 | 5/2002 | Stewart et al. | |
| 7,818,192 B2 * | 10/2010 | Kymal et al. | 705/7.38 |
| 8,055,514 B2 * | 11/2011 | Elsholz | 705/3 |
| 8,341,013 B2 * | 12/2012 | Lee | 705/7.42 |
| 8,577,711 B2 * | 11/2013 | Korecki et al. | 705/7.15 |
| 2005/0091071 A1 * | 4/2005 | Lee | 705/1 |
| 2005/0203760 A1 * | 9/2005 | Gottumukkala et al. | 705/1 |
| 2006/0253289 A1 * | 11/2006 | Kymal et al. | 705/1 |
| 2008/0027789 A1 * | 1/2008 | Busch et al. | 705/11 |
| 2008/0270164 A1 * | 10/2008 | Kidder et al. | 705/1 |

(Continued)

FOREIGN PATENT DOCUMENTS

WO    WO2007143001 A2    12/2007

OTHER PUBLICATIONS

Final Office Action for U.S. Appl. No. 13/341,605, mailed on Dec. 17, 2013, Jonathan L. Woods, "Transparent Transaction Certification for Accountable Entities", 11 pages.

(Continued)

*Primary Examiner* — Thanh-Ha Dang
(74) *Attorney, Agent, or Firm* — Lee & Hayes, PLLC

(57) ABSTRACT

An accountability provider is configured to enable specification of queries for data sources of accountable entities. The queries are based on an analysis of transparency goals of the accountable entities and utilize transparency metrics of those entities. The accountability provider is further configured to present representations of the transparency metrics generated responsive to the queries, to enable interaction with the representations, and to update the representations based on at least one of viewer requests or viewer interactions. Also, the accountability provider is configured determine representations of transparency metrics available to viewers based on viewer descriptors and to present the determined representations responsive to logins of the viewers.

20 Claims, 7 Drawing Sheets

(56) References Cited

U.S. PATENT DOCUMENTS

| | | | |
|---|---|---|---|
| 2008/0270181 A1* | 10/2008 | Rosenberg | 705/2 |
| 2009/0112753 A1* | 4/2009 | Gupta et al. | 705/38 |
| 2009/0193217 A1* | 7/2009 | Korecki et al. | 711/170 |
| 2011/0238641 A1 | 9/2011 | Labuda et al. | |
| 2012/0215574 A1* | 8/2012 | Driessnack et al. | 705/7.12 |
| 2013/0042190 A1* | 2/2013 | Ciloci | 715/764 |

OTHER PUBLICATIONS

Non-Final Office Action for U.S. Appl. No. 13/341,605, mailed on May 24, 2013, Jonathan L. Woods et al., "Transparent Transaction Certification for Accountable Entities", 12 pages.

Office Action for U.S. Appl. No. 13/341,605, mailed on Nov. 13, 2014, Jonathan L. Woods, "Transparent Transaction Certification for Accountable Entities", 15 pages.

* cited by examiner

TRANSPARENCY DATA ANALYSIS AND REPORTING

BACKGROUND

In the wake of the Enron scandal, the United States enacted the Sarbanes-Oxley Act of 2002 ("SarbOx") to answer the outcry for transparency and accountability. The Enron scandal revealed malfeasance at the highest levels, with executives and controllers modifying financial data to present a false image to investors and the public. To prevent future occurrences of such fraud, SarbOx requires corporate officers to implement and certify internal control structures that enable identification of financial misstatements. Such controls and certifications bring confidence to investors, ensuring a ready flow of their capital to companies regulated by SarbOx.

While SarbOx brought accountability and transparency to publicly-traded companies, other entities are free from its strictures. These other entities, including state and local governments, educational institutions, and non-profits, need not implement internal control structures or certify such structures. This lack of accountability and transparency hurts both the public and the entities themselves. The public is often left with the impression that these entities are, at the least, wasteful and incompetent, spending taxes, fees, or donations in an out-of-control manner. And when these entities seek to raise funds through the issuance of bonds, they are forced to offer higher interest rates on the bonds in order to attract investors. The long term implications of this dynamic have been sadly displayed in the sovereign debt crises of Europe in the summer and fall of 2011: a total loss of a public's faith in its institutions and the inability of those institutions to fund and perform even the most basic services.

SUMMARY

In order to bring accountability and transparency to entities such as state and local governments, educational institutions, and non-profits, an accountability provider enables controlled certification of transactions of the entities, reporting and display of transparency metrics associated with transparency goals of the entities, and publication of transparency metrics to any or select viewers. The accountability provider specifies queries of accountable entity data sources, the queries utilizing the transparency metrics and being based on analyses of the transparency goals of the accountable entities. The accountability provider also enables transaction participants associated with transactions of the entities to certify the transactions and, responsive to the certifications, locks the transactions to inhibit individuals associated with the accountable entities from modifying the transactions. The accountability provider then generates and displays the representations of transparency metrics based on the specified queries, enables interaction with the representations, and updates the representations based on viewer interactions or viewer requests. Also, the accountability provider enables publication of the representations on websites and controls access to the published representations based on viewer descriptors, such as addresses of the viewers.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

DETAILED DESCRIPTION

Overview

Figure 1:
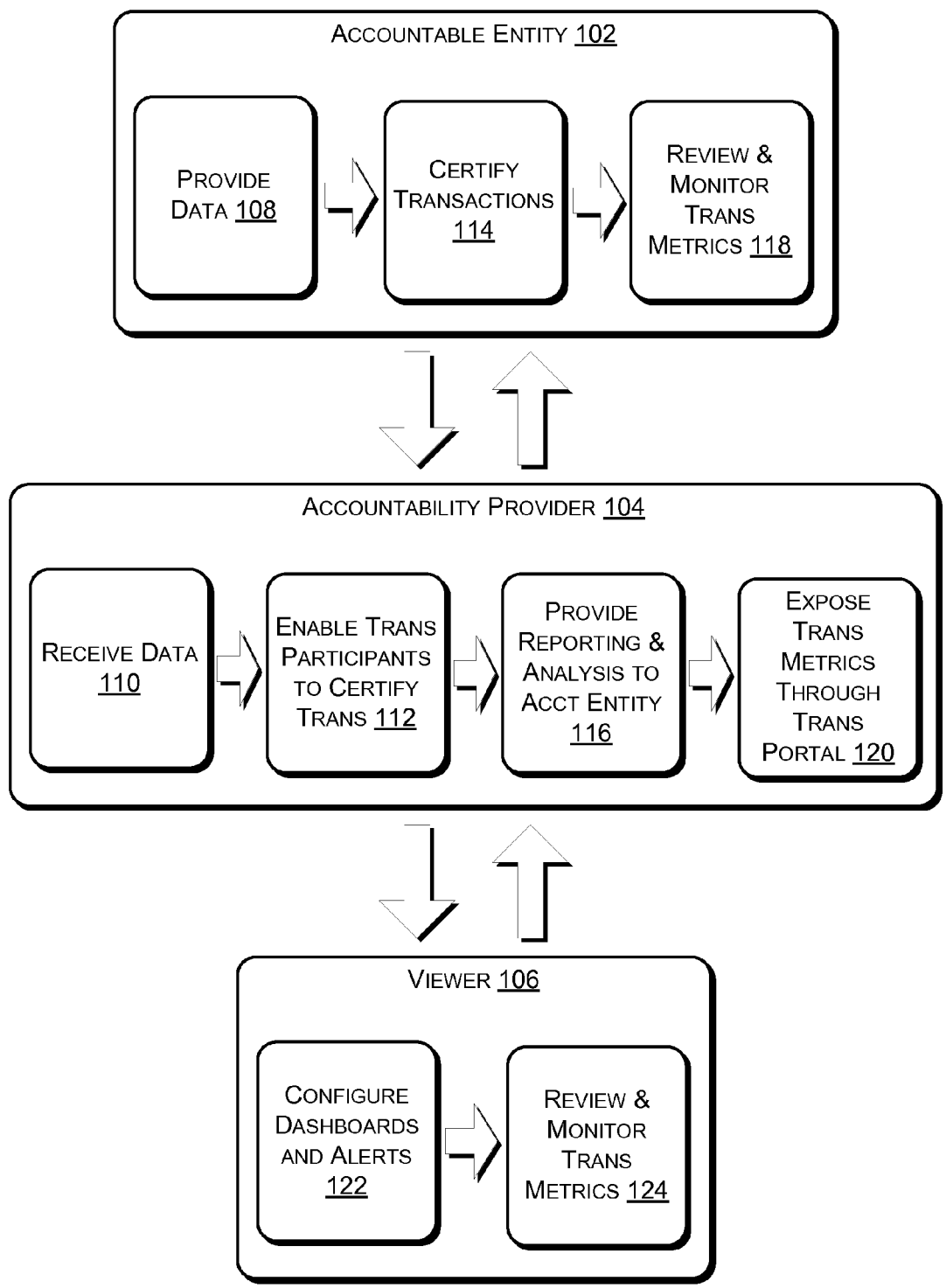
FIG. 1 illustrates an overview of techniques for providing transparency and accountability for an accountable entity by certifying transactions and by analyzing and exposing transparency data, in accordance with various embodiments.
Figure 2:
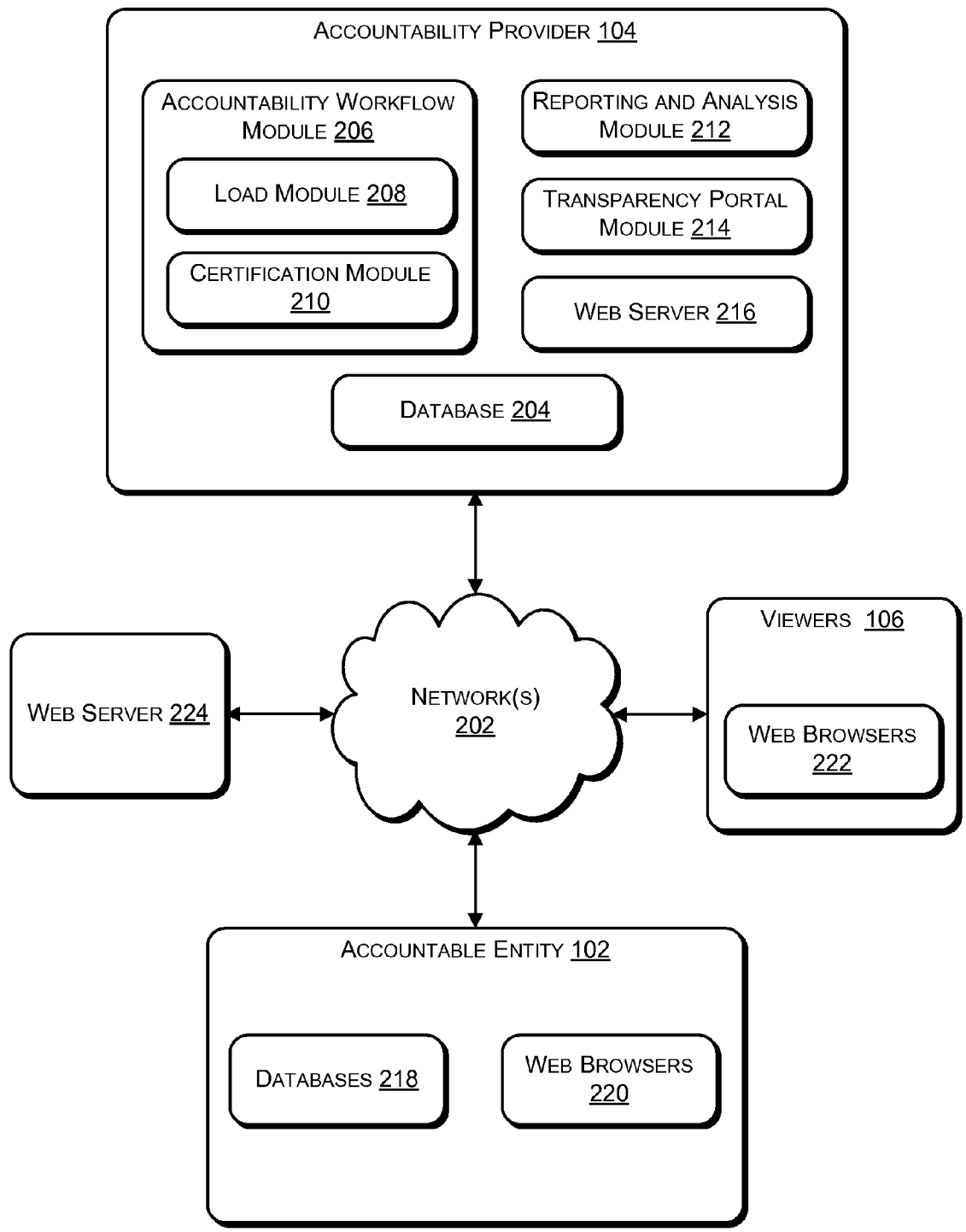
FIG. 2 illustrates an example environment including an accountable entity, accountability provider, and viewer systems, in accordance with various embodiments.
Figure 3:
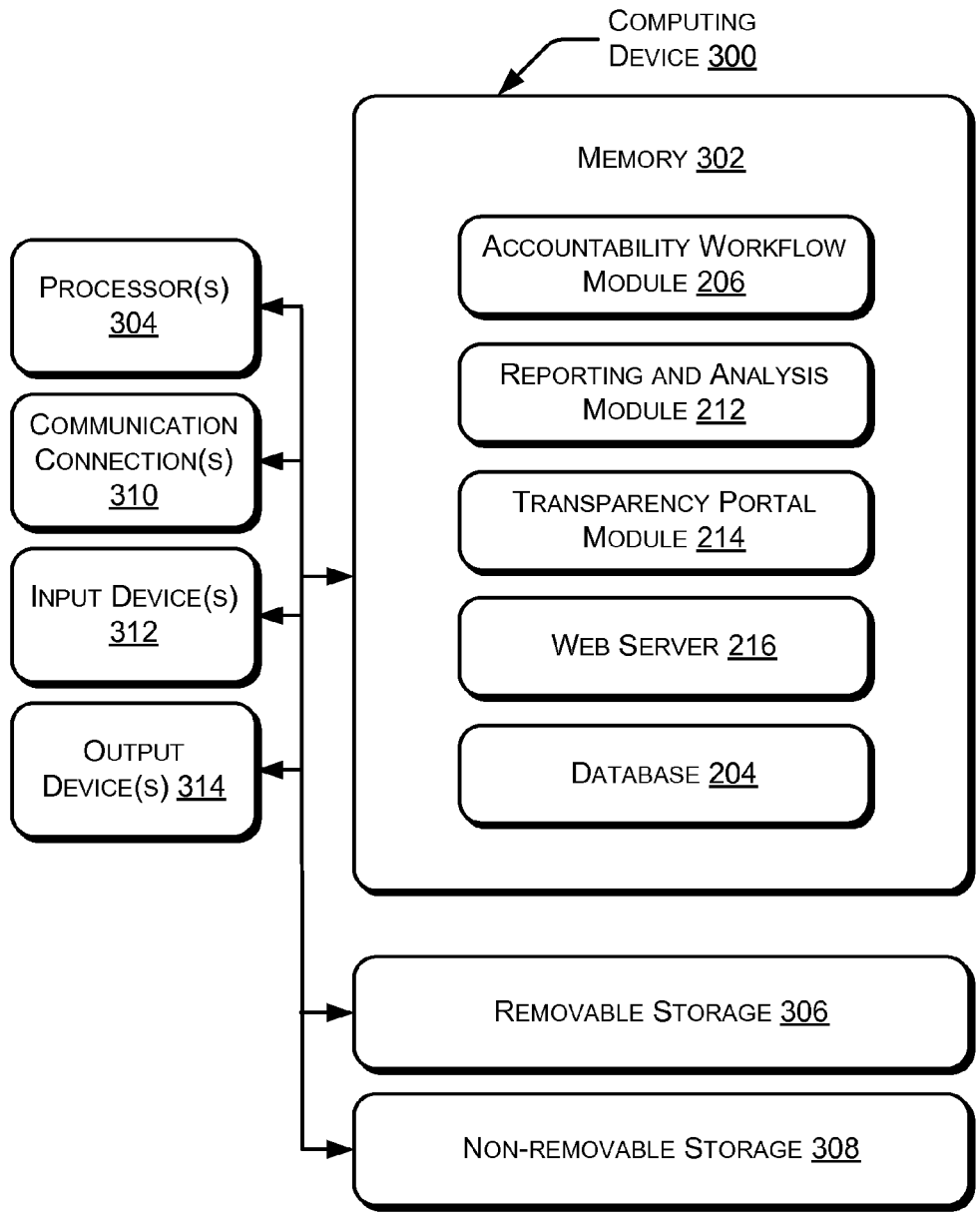
FIG. 3 is a block diagram of an example computer system architecture of an accountability provider configured to provide accountability and transparency for an accountable entity, in accordance with various embodiments.

FIG. 1 illustrates an overview of techniques for providing transparency and accountability for an accountable entity by certifying transactions and by analyzing and exposing transparency data, in accordance with various embodiments. As illustrated, an accountable entity 102 and accountability provider 104 interact with each other to control transaction certification and to monitor and generate representations of transparency metrics associated with transparency goals of the accountable entity 102. The accountable entity 102 and/or accountability provider 104 may then publish some or all of the representations of transparency metrics to one or more viewers 106. Each of the accountable entity 102, accountability provider 104, and the viewers 106 may be associated with one or more computing devices that perform some or all of the actions 108-124 shown in FIG. 1. Examples of these computing devices and network(s) connecting the devices are shown in FIGS. 2 and 3 and are described in greater detail below with reference to those figures.

As mentioned above, the accountable entity 102 may be a state or local government or branch thereof, an educational institution, a non-profit, or any other sort of public or private entity. The accountable entity 102 has one or more data sources that include data which may be indicative of the performance of the accountable entity 102 in achieving transparency goals. This data is referred to herein as "transparency data" and may include transaction data associated with transactions engaged in by personnel of the accountable entity 102. The transparency data may include either or both of historical data or real time data and may comprise performance indicators and key performance indicators. For example, the accountable entity 102 may be a state government that has invested in a teen pregnancy education program. The accountable entity 102 may desire to show that the program is cost effective and to publish news of this success to residents of the state. In order to achieve these transparency goals, the accountable entity 102 identifies key performance indicators, such as dollars spent on the program and pregnancy statistics by age group, and data sources that include these key performance indicators. Performance indicators and key performance indicators bearing on a transparency goal are referred to herein as "transparency metrics."

In various embodiments, the accountability provider 104 works with accountable entities 102 to enable those accountable entities 102 to achieve their transparency goals. The accountability provider 104 relies on either or both of business analysts or machine intelligence in determining and analyzing transparency goals for accountable entities, in controlling transaction certification, in reporting on and presenting transaction metric representations to the accountable entities 102, and in publishing the transaction metric representations in a restricted or open manner to viewers 106.

Continuing to refer to the above example, human and/or machine intelligence of the accountability provider 104 may work with the accountable entity 102 to identify the transparency goals and transparency metrics. In one case, business analysts of the accountability provider 104 may meet with stakeholders of the accountable entity 102 and discuss various goals of the accountable entity 102, such as demonstrating the cost effectiveness of a teen pregnancy education program. Also during the meeting, the analysts and stakeholders may identify transparency metrics and data sources that would include those metrics. The analysts may then utilize this information to formulate queries of the data sources in order to generate reports and representations of transparency metrics.

In another case, rather than identifying transparency metrics and data sources, the accountable entity 102 may make available some or all of its data sources and machine intelligence of the accountability provider 104 may utilize the data stored in those data sources or metadata describing that data to determine data items related to the identified transparency goals. For instance, the machine intelligence may perform a semantic analysis on the data or metadata to determine data items that may be related to teen pregnancy statistics and costs. The machine intelligence may use machine learning techniques to improve the results of the semantic analysis either over time or initially based on a set of training data.

In a further case, the accountable entity 102 may indicate that its transparency goals are rather undefined, but may indicate that it would like to demonstrate the cost effectiveness of expenditures. In such a case, the machine intelligence of the accountability provider 104 may review the data sources of the accountable entity 102 to identify transactions where funds where expended and use the above semantic analysis or other techniques to logically group the expenditures. The machine intelligence then uses the semantic analysis or other techniques to identify other data in other data sources that appears connected to the expenditures. For instance, checks paid in the teen pregnancy education program may be associated with persons working on that program or marked in the data sources as being associated with that program. The machine intelligence may determine that the teen pregnancy program is a logical group and may identify other data, such as teen pregnancy statistics, that may appear semantically related to the program. Once data items and sources are identified, the machine intelligence may apply any of a number of techniques to determine which data items are "transparency metrics." For instance, the machine intelligence may utilize data source schemas to determine the number of tables each data item is included in and may take this as a measure of significance of the data item. The machine intelligence may also be rule-driven, considering, for instance, numbers more important than string values. As in the above case, machine learning techniques may be utilized to improve results.

In addition to identifying transparency goals, transparency metrics, and data sources, the accountable entity 102 and/or accountability provider 104 may also identify viewer roles and lists of transparency metric representations viewable for each viewer role. Viewer roles may be specific roles within the accountable entity 102, such as governor, department head, controller, case worker, etc. Viewer roles may also include categories of individuals outside of the accountable entity 102, such as residents of a state. These viewer roles may be identified by analysts and stakeholders or determined by machine intelligence. The accountable entity 102 and/or accountability provider 104 may also identify lists of transparency metric representations viewable for each viewer role. For example, the governor may have access to all representations of all transparency metrics, department heads to representations of transparency metrics for their departments, and controllers to representations of transparency metrics associated with financial data, including transactions. In some embodiments, other viewer roles associated with viewers 106 outside of the accountable entity 102 might not have access to any representations of transparency metrics. In other embodiments, access may be limited (e.g., some or all or the representations of transparency metrics for a state being viewable by residents of the state) or open to any viewers 106.

Once transparency goals, transparency metrics, and data sources are identified, the accountable entity 102 and accountability provider 104 may proceed with the actions 108-120. Upon performance of some or all of these actions, a viewer 106 may have open or limited access to representations of transparency metrics. The identities of the viewers 106 and their level of access may be determined by the accountable entities 102. Continuing with the above example, the accountable entity 102 may wish to allow all residents of the state to view the representations of transparency metrics but prevent those residing outside the state from viewing the metrics. In such cases, the accountable entity 102 or accountability provider 104 may require registration and login by viewers 106 to determine whether viewers 106 are to have access to the representations.

In various embodiments, after the transparency goals, transparency metrics and data sources have been identified, the accountable entity 102 provides 108 the transparency data and the accountability provider 104 receives 110 the transparency data. The providing 108 and receiving 110 may involve providing the accountability provider 104 with read access to the data sources or even providing the accountability provider 104 with copies of the data sources. Any mechanism may be used by the accountable entity 102 and accountability provider 104 which results in the accountability provider 104 receiving at least the transparency data of the data sources that relates to the transparency goals and transparency metrics. In some embodiments, the transparency data may be provided and received on an ongoing basis (e.g., periodically, randomly, etc.).

Once the accountability provider 104 has received 110 the transparency data, the accountability provider 104 loads the transparency data into a database and parses, verifies, and reconciles the transparency data. Such parsing, verification, and reconciliation may involve consistency checks and may trigger alerts resulting in the accountable entity 102 and accountability provider 104 working together to resolve inconsistencies or other errors in the transparency data.

In some embodiments, the accountability provider 104 then determines parts of the transparency data associated with transactions (referred to herein as "transaction data") as well as personnel of the accountable entity 102 associated with the transactions. These personnel are referred to as "transaction participants" and are the only individuals in the accountable entity 102 allowed to modify the transaction data. Identifications of transactions and transaction participants may be performed by analysts or machine intelligence of the accountability provider 104, or by some combination of both. The analysts and/or machine intelligence may also identify one or more reviewers associated with each transaction. Such reviewers may be supervisors of the transaction participants or persons with financial responsibilities within the accountable entity 102, such as controllers. These reviewers may be identified using and organizational chart or may have been identified in the above-described identification of viewer roles.

In various embodiments, the accountability provider 104 then enables 112 transaction participants to certify transactions, and the transaction participants of the accountable entity 102 certify 114 those transactions. Upon identifying transactions needing certification and their associated transaction participants, the accountability provider 104 may email the transaction participants notifying them that their certification is needed and providing a link to a website or other user interface facilitating certification. In other embodiments, the transaction participants may login to the website or user interface independently of receiving emails and may be presented with lists of transactions needing certification. The transaction participants may then review details of the transactions and certify the transactions.

Upon certification, the transaction data associated with the certified transactions is locked, preventing further modifications by the transaction participants or other individuals associated with the accountable entity 102. The accountability provider 104 may also notify reviewers to enable approval or disapproval of the certifications by the reviewers. As mentioned, a transaction may be associated with a single reviewer or multiple reviewers, and the approvals/disapprovals by multiple reviewers may be in sequence or in parallel. In some embodiments, the accountability provider 104 emails the reviewers responsive to a certification, providing a link to the website or user interface to enable approval or disapproval. In other embodiments, the reviewers may login to the website or user interface independently of emails and may be presented with lists of certifications needing approval or disapproval.

In various embodiments, the reviewers may approve the certifications of the transactions, and once all appropriate reviewers have approved, the transactions are considered certified by the accountability provider 104 and are not presented to the accountable entity 102 for further modifications or certifications. Certified transactions are marked as such in databases of the accountability provider 104.

The reviewers may also disapprove the certifications of transactions and request further explanation or additional details from the transaction participants. In response to a disapproval, the accountability provider 104 unlocks the transaction data with respect to the transaction participant, enabling the transaction participant to correct errors, add further explanation, etc. The transaction participant then recertifies the transaction, causing the accountability provider 104 to lock the transaction from further changes. The accountability provider 104 then notifies any parties associated with the transaction that the transaction data has been modified and requests reviewer approval/disapproval or the recertification.

In some embodiments, the accountability provider 104 reconciles certified transactions with financial statements of the accountable entity 102. Such reconciliation may be responsive to a transparency goal and be associated with one or more transparency metrics. For example, the transparency metric may be a binary measure of whether or not the certified transactions reconcile with information presented in a financial statement.

Prior to, during, or after enabling certification of the transactions, the accountability provider 104 enables specification of queries utilizing the transparency metrics. The queries are based on the analysis of the transparency goals and, like that analysis, may involve either or both of human or machine intelligence. For example, the queries may be automatically specified by machine intelligence of the accountability provider 104 based on the transparency goals. If the transparency goal is demonstrating the cost effectiveness of a teen pregnancy education program and the transparency metrics are program costs and pregnancy statistics, then the machine intelligence may specify one or more queries associated with that goal and those metrics. Also, in enabling specification of the queries, the human or machine intelligence of the accountability provider 104 may specify the queries in a query language capable of being utilized with either or both of the data sources of the accountable entity 102 or the database of the accountability provider 104.

The accountability provider 104 then performs the queries on the transparency data. As mentioned, that data may be stored in a database of the accountability provider 104 or recovered from data sources of the accountable entity 102. In some embodiments, the accountability provider 104 may utilize a tool, such as a third party tool, which receives queries and data sources and, in response, generates representations associated with the queried data from those data sources. These representations may be presented in a user interface, such as a dashboard user interface, that includes graphs, charts, grids, gauges, and/or maps. In other embodiments, other machine intelligence of the accountability provider 104 may perform the queries on the data sources and generate the representations. In these other embodiments, a dashboard user interface or other user interface may likewise be generated. Regardless of the tool used, the generated representations of the transparency metrics that result from the queries may be stored for presentation to the accountable entity 102 and, optionally, viewers 106. Also, in some embodiments, the representations may be periodically updated in response to periodic specification of the queries and performance of the querying.

In various embodiments, the accountability provider 104 then provides 116 reporting and analysis to the accountable entity 102 in the form of monitoring transparency data, generating alerts, and presenting the generated representations of transparency metrics. Based on these alerts and presented representations, the accountable entity 102 reviews and monitors 118 the transparency metrics to determine whether transparency goals are being achieved.

The accountability provider 104 monitors the transparency data upon receiving it from the accountable entity 102 and looks for evidence of fraud or other abuse. To detect fraud or abuse, the accountability provider 104 utilizes fraud detection mechanisms like those utilized by credit card companies. Upon detecting fraud or abuse, the accountability provider 104 generates an alert (e.g., an email or other message) and notifies the accountable entity 102 of the issue. In addition to monitoring the transparency data to detect fraud or abuse, the accountability provider 104 monitors the transparency data to detect when thresholds associated with transparency metrics are not met or are exceeded. In response to detecting that thresholds are not met or are exceeded, the accountability provider 104 generates an alert (e.g., an email) and notifies the accountable entity 102 of the issue.

In response to receiving an alert, a user associated with the accountable entity 102 may log into a user interface associated with the accountability provider 104, such as a dashboard user interface provided in a web-based manner. The accountability provider 104 then authenticates the login and determines the level of access associated with that user. In some embodiments, the level of access may be based on the role of the user. Some portion of the user interface may contain links to or information on the alerts, allowing the user to view additional details on the data that gave rise to the alerts.

In various embodiments, users associated with the accountable entity 102 may also log into the user interface independently of receiving alerts. Users may log in at any time to review representations of transparency metrics that are accessible to those users (i.e., based on their roles). Upon authenticating a login, the accountability provider 104 presents the representations to the logged-in user via the user interface. As mentioned, such representations may be presented as graphs, charts, grids, gauges, and/or maps. The presented user interface may also be interactive, enabling the user to switch between different representations of transparency metrics, view an additional level of detail associated with a transparency metric, or view an audit trail for a certified transaction associated with a transparency metric. For example, the user may interact with a representation to view documentation of a transaction's certification.

In some embodiments, human or machine intelligence of the accountability provider 104 may update the representations of transparency metrics responsive to user interactions or user requests. For example, a user may request a representation of a different transparency metric or a new chart or graph. Responsive to the request, the accountability provider 104 may update the query or specify a new query to generate the new or modified representation. In another example, the accountability provider 104 may utilize machine learning techniques to update the queries and representations over time based on which representations the users interact with. If users interact with one group of representations with some frequency and rarely interact with another representation, the query may be modified to avoid future generate of that other representation and even avoid further use of the transparency metric(s) associated with that other representation. These machine learning techniques may result in better identification of transparency metrics and better selection of representations of those metrics over time.

Also, the accountability provider 104 may update the representations of transparency metrics based on a target metric provided by a user. Continuing with the above example, the user may want to determine the results of the teen pregnancy education program if the costs were reduced by 20%. That 20% reduced cost serves as the target transparency metric, and the accountability provider 104 may determine or predict changes to other transparency metrics based on this target transparency metric. For instance, the accountability provider 104 may determine a period in time when expenditures matched the 20% reduced cost and look at pregnancy statistics in a commensurate time period (e.g., nine months after). These statistics may form the updated transparency metrics, and the accountability provider 104 may generate updated representations of these updated transparency metrics to present to the viewer wishing to know the cost effectiveness of the program when costs are reduced.

Either prior to, concurrently with, or after presenting the representations of transparency metrics to users, the accountability provider 104 may expose 120 transparency metrics through a transparency portal to viewers 106. As mentioned above, this exposing of transparency metrics may be elective on the part of the accountable entity 102, with the accountable entity 102 electing not to expose some or even any of the transparency metrics. In embodiments where the accountable entity 102 has elected to expose some or all of the transparency metrics, viewers 106 may receive the transparency metrics in the form of a dashboard user interface that include representations of transparency metrics, such as the graphs, charts, grids, gauges, and/or maps mentioned above. The accountability provider 104 may also generate, and viewers 106 receive, alerts regarding any or all of fraud, abuse, or unmet/exceeded transparency metric thresholds. The alerts available to viewers 106 may also be determined by the accountable entity 102. The viewers 106 may then configure 122 the dashboard user interface and alerts they receive, selecting, for example, to receive only a subset of the representations and alerts made available. The viewers 106 may also log in at any time to review and monitor 124 the exposed transparency metrics.

In various embodiments, prior to accessing the dashboard user interface or alerts, a viewer 106 must register with the accountability provider 104. The enrollment may involve entering information into a web form provided on a website of the accountability provider 104, of the accountable entity 102, or of another person or entity. In other embodiments, registration may occur over the phone rather than via a website. Regardless of the entity providing the website enrollment form, the information is transmitted to the accountability provider 104, and the accountability provider 104 determines which representations of which transparency metrics the viewer 106 may receive. In making this determination, the accountability provider 104 may determine one or more descriptors of the viewer 106, such as a residential address, vital statistics, educational credentials, a current employer, an employment history, or a security clearance, and determine associations of those descriptors with viewer roles of one or more accountable entities 102. For example, the viewer 106 may be a resident of Washington State and a graduate of Gonzaga University. This information may be gathered from the viewer 106, from the data sources of accountable entities 102, or from some combination of both. For instance, the viewer's address may be obtained from a driver's license database of the State. The accountability provider 104 may then determine that one accountable entity 102—Washington State—allows residents of the State to view some of its transparency metrics and another accountable entity 102—Gonzaga University—allows graduates of the School to view all of its transparency metrics.

In other embodiments, no enrollment may be required for some transparency metrics of some accountable entities. In such embodiments, the website exposing the dashboard user interface may provide a default login to the accountability provider 104, and the accountability provider 104 determines which transparency metrics are available to any viewers 106.

Once available transparency metrics have been determined for a viewer 106, the accountability provider 104 presents representations of those transparency metrics to the viewer 106. The accountability provider 104 may present the representations through a dashboard user interface published through a website of the accountability provider 104 or through a website of another entity. The dashboard user interface may be published through a web site of another entity using a viewer control, such as a Microsoft Silverlight® object. The dashboard user interface may include representations of transparency metrics associated with multiple accountable entities 102 or a single accountable entity 102.

The viewer 106 may then interact with the dashboard user interface, the range of interactions available also being controlled by the accountable entity 102. For example, the viewer 106 may switch between different representations of transparency metrics, view an additional level of detail associated with a transparency metric, and/or view an audit trail for a certified transaction associated with a transparency metric.

Example Environment

FIG. 2 illustrates an example environment including an accountable entity, accountability provider, and user systems, in accordance with various embodiments. As illustrated, one or more networks 202 connect the accountable entity 102, the accountability provider 104, and the viewers 106. The network(s) 202 may be any one or more networks, such as wide area networks (WANs), local area networks (LANs), or the Internet. Also, the network(s) 202 may be public, private, or include both public and private networks. Further, the network(s) 202 may be wired, wireless, or include both wired and wireless networks. The network(s) 202 may utilize any one or more protocols for communication, such as the Internet Protocol (IP), other packet based protocols, or other protocols. Additionally, the network(s) 202 may comprise any number of intermediary devices, such as routers, base stations, access points, firewalls, or gateway devices.

In various embodiments, the accountable entity 102, the accountability provider 104, and the viewers 106 may each have one or more computing devices to perform some or all of the operations described herein. Such computing devices may be any sort of computing devices. For example, the computing devices may be or include personal computers (PCs), laptop computers, servers or server farms, mainframes, tablet computers, work stations, telecommunication devices, personal digital assistants (PDAs), media players, media center devices, personal video recorders (PVRs), televisions, or any other sort of devices. In one implementation, the one or more of the computing devices represent a plurality of computing devices working in communication, such as a cloud computing network of nodes. In some implementations, one or more of the computing devices represent one or more virtual machines implemented on the one or more computing devices. An example computing device is illustrated in FIG. 3 and is described below in greater detail with reference to that figure.

The computing device or devices of the accountability provider 104 may include at least the database 204, the accountability workflow module 206, which in turn includes load module 208 and certification module 210, the reporting and analysis module 212, the transparency portal module 214, and the web server 216. Each of the modules 206-214 and web server 216 may include any one or more applications, processes, threads, or functions. The database 204 may be any sort of database, such as a relational database, and may store the transparency data obtained from the data sources of the accountable entity 102.

The accountability workflow module 206 performs the enabling of certification described in greater detail herein. The load module 208 of the accountability workflow module 206 loads the data from the database 204 and parses, verifies, and reconciles the data. The certification module 210 requests certification from transaction participants, locks transactions upon certification, notifies reviewers of certification to obtain approval or disapproval, and notifies other parties to the transaction of changes to the transaction data. The accountability workflow module 206 may also reconcile the certified transactions with a financial statement of the accountable entity 102.

The reporting and analysis module 212 detects fraud or abuse, detects unmet/exceeded thresholds for transparency metrics, generates and provides alerts, presents the representations of transparency metrics through a dashboard user interface, enables interaction with the representations, and updates the representations based on user interaction or user requests.

The transparency portal module 214 manages enrollment of viewers 106, determines representations accessible to the viewers 106, presents the representations through a dashboard user interface, and enables the viewers 106 to refine the representations displayed to them, enabling selection of a subset.

The web server 216 may present the dashboard user interface to one or both of users of the accountable entity 102 or viewers 106 through one or more web pages. These web pages may also include enrollment forms and/or login pages.

In various embodiments, the computing device or devices of the accountable entity 102 may include at least the database(s) 218 and the web browsers 220. The database(s) 218 may be any sort of databases, such as relational databases, and are the one or more data sources described in greater detail herein that store the transparency data. The web browsers 220 may include any one or more applications, processes, threads, or functions. Further, the web browsers 220 allow the users of the accountable entity 102 to view and interact with the dashboard user interface and any received alerts.

In some embodiments, the computing device or devices of the viewers 106 may include at least the web browsers 222. The web browsers 222 may include any one or more applications, processes, threads, or functions. Further, the web browsers 222 allow the viewers 106 to view and interact with the dashboard user interface and any received alerts.

As is further shown in FIG. 2, the network(s) 202 may also be connected to a web server 224. The web server 224 may include any one or more applications, processes, threads, or functions. Further the web server 224 may present the dashboard user interface to one or both of users of the accountable entity 102 or viewers 106 through one or more web pages. These web pages may also include enrollment forms and/or login pages. Because the web server 224 is external to the accountability provider 104, the web server 224 utilizes a viewer control, such as a Microsoft Silverlight® object, to retrieve and display the dashboard user interface. In some embodiments, the web server 224 is associated with the accountable entity 102 or independent of the both the accountable entity 102 and accountability provider 104.

Example System Architecture

FIG. 3 is a block diagram of an example computer system architecture of an accountability provider 104 configured to provide accountability and transparency for an accountable entity 102, in accordance with various embodiments. As shown, an example computing device 300 of the accountability provider 104 may comprise at least a memory 302 (including a cache memory) and one or more processing units (or processor(s)) 304. The processor(s) 304 may be implemented as appropriate in hardware, software, firmware, or combinations thereof. Software or firmware implementations of the processor(s) 304 may include computer-executable or machine-executable instructions written in any suitable programming language to perform the various functions described. Processor(s) 304 may also or alternatively include one or more graphic processing units (GPUs).

Memory 302 may store program instructions that are loadable and executable on the processor(s) 304, as well as data generated during the execution of these programs. Depending on the configuration and type of computing device, memory 302 may be volatile (such as random access memory (RAM)) and/or non-volatile (such as read-only memory (ROM), flash memory, etc.). The computing device 300 may also include additional removable storage 306 and/or non-removable storage 308 including, but not limited to, magnetic storage, optical disks, and/or tape storage. The disk drives and their associated computer-readable media may provide non-volatile storage of computer readable instructions, data structures, program modules, and other data for the computing devices. In some implementations, the memory 302 may include multiple different types of memory, such as static random access memory (SRAM), dynamic random access memory (DRAM), or ROM.

Computer-readable media includes, at least, two types of computer-readable media, namely computer storage media and communications media.

Computer storage media includes volatile and non-volatile, removable and non-removable media implemented in any method or technology for storage of information such as computer readable instructions, data structures, program modules, or other data. Computer storage media includes, but is not limited to, RAM, ROM, erasable programmable read-only memory (EEPROM), flash memory or other memory technology, compact disc read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device.

In contrast, communication media may embody computer readable instructions, data structures, program modules, or other data in a modulated data signal, such as a carrier wave, or other transmission mechanism. As defined herein, computer storage media does not include communication media.

The computing device 300 may also contain communications connection(s) 310 that allow the computing device 300 to communicate with a stored database, another computing device or server, user terminals, and/or other devices on a network. The computing device 300 may also include input device(s) 312, such as a keyboard, mouse, pen, voice input device, touch input device, etc., and output device(s) 314, such as a display, speakers, printer, etc.

Turning to the contents of the memory 302 in more detail, the memory 302 may include the accountability workflow module 206 (and consequently its load module 208 and certification module 210), the reporting and analysis module 212, the transparency portal module 214, the web server 216, and the database 204, which may each represent any one or more modules, applications, processes, threads, or functions. The accountability workflow module 206, the reporting and analysis module 212, the transparency portal module 214, the web server 216, and the database 204 are described above in greater detail. The memory 202 may further store data associated with and used by the accountability workflow module 206, the reporting and analysis module 212, the transparency portal module 214, the web server 216, and the database 204, as well as modules for performing other operations.

Example Operations

FIGS. 4-7 are flowcharts showing operations of example processes. The operations of the processes are illustrated in individual blocks and summarized with reference to those blocks. These processes are illustrated as logical flow graphs, each operation of which may represent a set of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Figure 4:
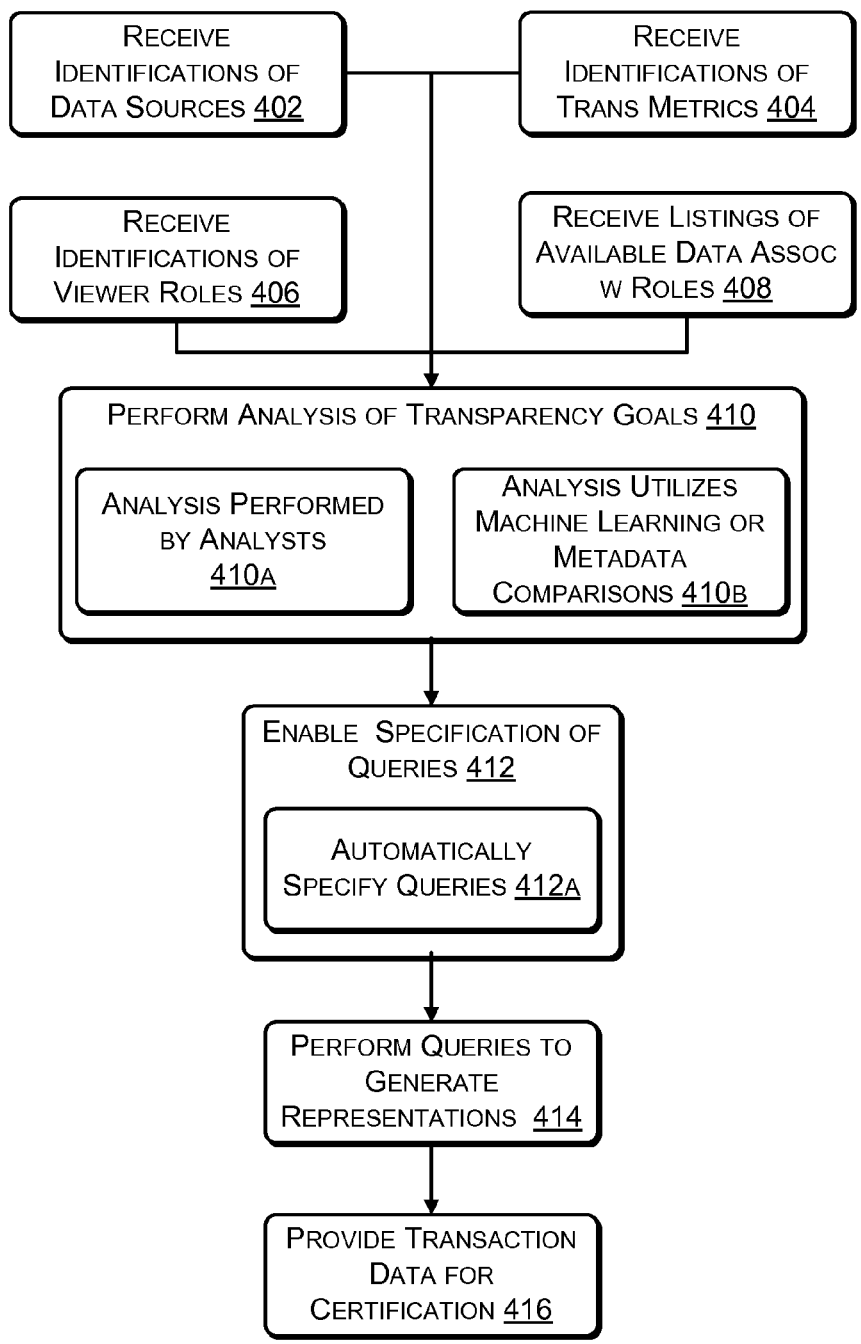
FIG. 4 is a flowchart showing an illustrative process for specifying and performing queries associated with transparency goals to generate representations of transparency metrics associated with those goals, in accordance with various embodiments.

FIG. 4 is a flowchart showing an illustrative process for specifying and performing queries associated with transparency goals to generate representations of transparency metrics associated with those goals, in accordance with various embodiments. As illustrated at block 402, an accountability provider receives identifications of data sources of the accountable entity. Such data sources may include accounting databases. At block 404, the accountability provider receives identifications of transparency metrics associated with data stored in the data sources and expressing degrees of achievement of transparency goals of the accountable entity. Such transparency metrics may include performance indicators and key performance indicators. At block 406, the accountability provider receives identifications of viewer roles and, at block 408, receives listings of transparency metrics and/or transparency data from the data sources available to viewers based on their viewer roles. The operations of block 402-408 may be performed in any order with respect to one another. Also, the identifications and listings of blocks 402-408 may be received electronically from the accountable entity or may be gathered by analysts of the accountability provider in meetings with stakeholders of the accountable entity.

At block 410, the accountability provider performs an analysis of transparency goals of the accountable entity. At block 410a, the analysis of transparency goals is performed at least in part by analysts associated with an accountability provider. At block 410b, the analysis of transparency goals utilizes one or both of machine learning techniques or comparisons of data source metadata.

At block 412, the accountability provider enables specification of queries utilizing the transparency metrics, the queries being based on an analysis of transparency goals of the accountable entity. At block 412a, enabling specification of the queries comprises automatically specifying the queries based on the analysis of the transparency goals. At block 414, the accountability provider performs the queries on the data sources to generate representations of the transparency metrics.

At block 416, the accountability provider provides transaction data associated with the transparency metrics to the accountable entity for certification by individuals associated with the transaction data.

Figure 5:
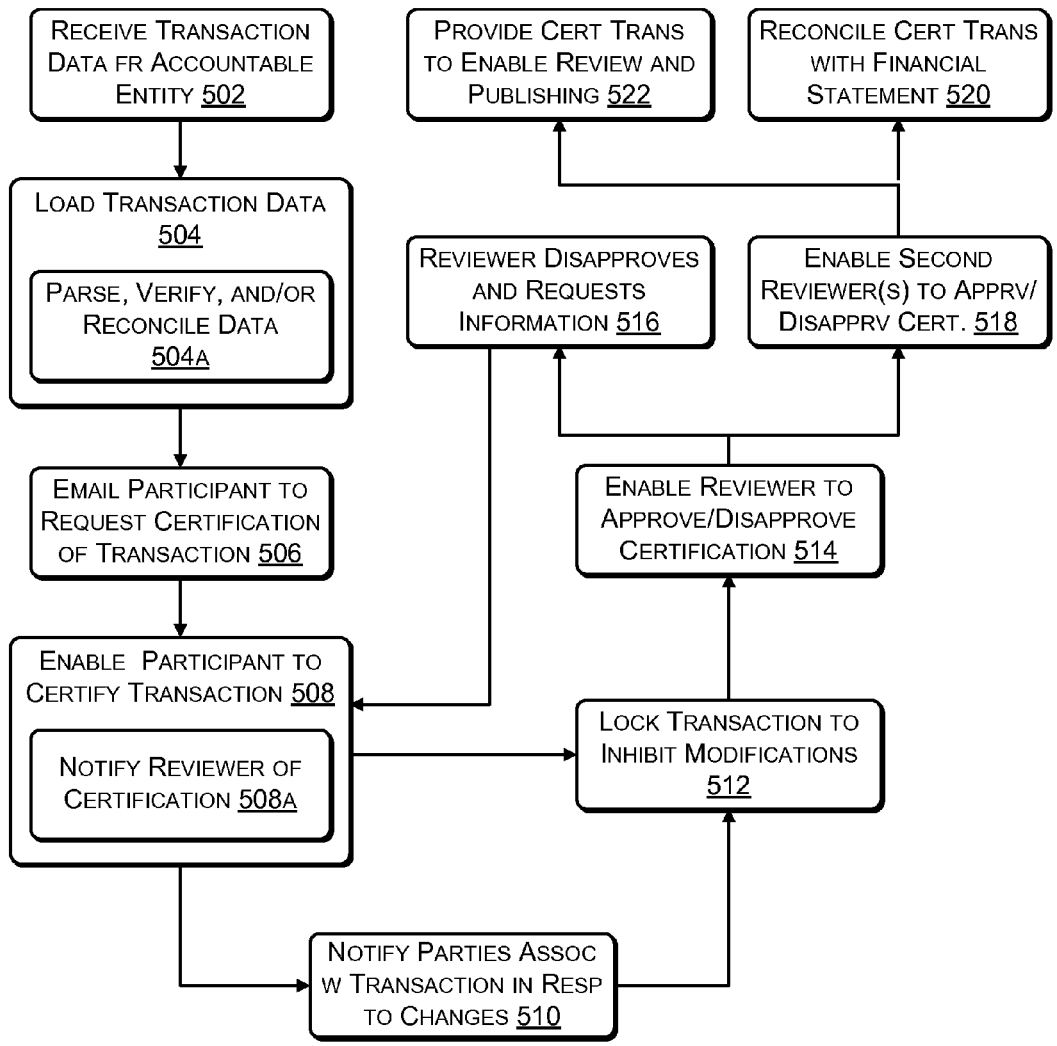
FIG. 5 is a flowchart showing an illustrative process for enabling certification of transactions by transaction participants of accountable entities, in accordance with various embodiments.

FIG. 5 is a flowchart showing an illustrative process for enabling certification of transactions by transaction participants of accountable entities, in accordance with various embodiments. As illustrated at block 502, an accountability provider receives transaction data from an accountable entity. At least a part of the transaction data may refer to a transaction associated with a transaction participant of the accountable entity. In some embodiments, the receiving comprises receiving accounting data that includes the transaction data from one or more accounting systems of the accountable entity. The accounting data may be a comprehensive collection of accounting data of the accountable entity and may be provided periodically.

At block 504, the accountability provider loads the transaction data into a database of the accountability provider. At block 504a, the loading may comprise parsing, verifying, and/or reconciling the transaction data.

At block 506, in response to receiving the transaction data, the accountability provider sends an email to the transaction participant requesting that the transaction participant certify the transaction. At block 508, the accountability provider enables the transaction participant to certify the transaction. At block 508a, the enabling comprises sending an email to a reviewer notifying the reviewer of the certification and requesting approval. The reviewer may be one of a supervisor of the transaction participant or an individual having financial responsibilities within the accountable entity.

At block 510, the accountability provider notifies some or all individuals associated with the transaction and with the accountable entity of the modification in response to a modification of the at least the part of the transaction data.

At block 512, the accountability provider, responsive to the certifying of the transaction, locks the transaction to inhibit individuals associated with the accountable entity from modifying the at least the part of the transaction data.

At block 514, the accountability provider, responsive to the certifying of the transaction, enables a reviewer associated with the accountable entity to approve or disapprove the certification of the transaction. At block 516, upon disapproval of the certification by the reviewer, the accountability provider notifies the transaction participant of disapproval of the transaction and requests additional information and recertification of the transaction by the transaction participant. At block 518, upon approval of the certification by the reviewer, the accountability provider enables one or more second reviewers associated with the accountable entity to approve or disapprove the certification of the transaction.

At block 520, upon completion of certification, the accountability provider reconciles one or more financial statements of the accountable entity against certified transactions. Additionally or alternatively, at block 522, the accountability provider provides the transaction data associated with certified transactions to an analytics process, a dashboard, and/or a transparency portal to enable reviewing and/or publishing the certified transactions.

Figure 6:
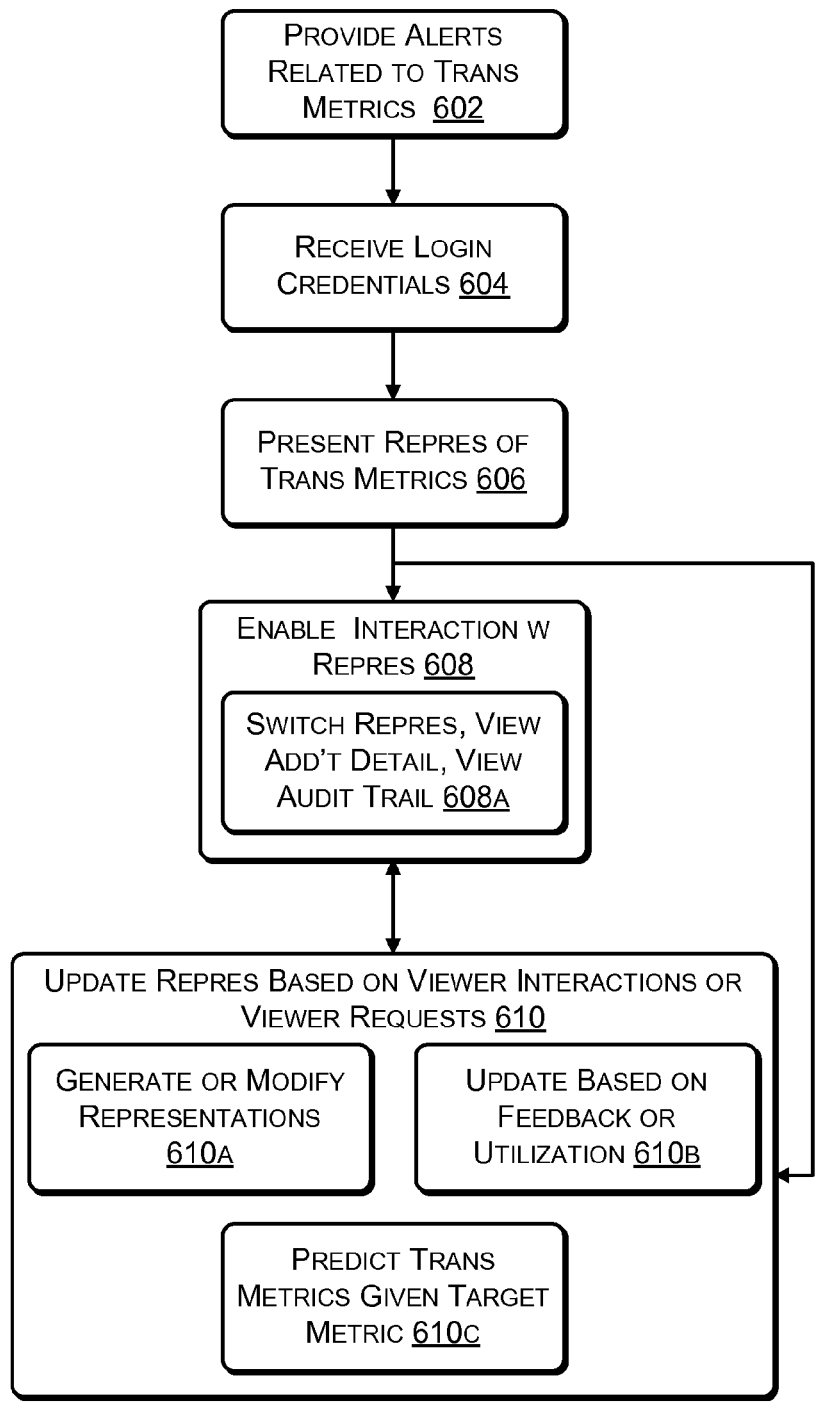
FIG. 6 is a flowchart showing an illustrative process for presenting representations of transparency metrics, enabling interaction with those representations, and updating the representations based on interactions or requests, in accordance with various embodiments.

FIG. 6 is a flowchart showing an illustrative process for presenting representations of transparency metrics, enabling interaction with those representations, and updating the representations based on interactions or requests, in accordance with various embodiments. At block 602, the accountability provider provides alerts when transparency metrics are not met or when thresholds associated with transparency metrics are exceeded. While such alerts are shown in FIG. 6 as being provided prior to login and presentation, it is to be understood that the alerts may be provided prior to, concurrently with, or after any of the operations 604-610 shown in FIG. 6. The alerts may also be provided periodically in response to continuous monitoring of the transparency metrics by the accountability provider.

At block 604, the accountability provider receives login credentials from a viewer. Responsive to the login, at block 606, the accountability provider presents one or more representations of transparency metrics for an accountable entity, the presenting based at least on a viewer role of the viewer. The representations may include graphs, charts, grids, gauges, and maps and may be presented via a dashboard user interface. Also, the representations of transparency metrics may include one or both of representations of historical data or representations of real time data.

At block 608, the accountability provider enables interaction with the one or more representations to obtain views of data associated with the transparency metrics. At block 608a, the enabled interaction may include at least one of switching between different representations of transparency metrics, viewing an additional level of detail associated with a transparency metric, or viewing an audit trail for a certified transaction associated with a transparency metric.

At block 610, the accountability provider updates the one or more representations based on one or both of viewer interactions and viewer requests. At block 610a, the updating comprises generating new representations or modifying existing representations. At block 610b, the updating based on viewer interactions comprises updating based on explicit feedback regarding the representations or updating based on utilization of the representations. At block 610c, the updating based on viewer interactions comprises predicting one or more transparency metrics given a target transparency metric provided by the viewer.

Figure 7:
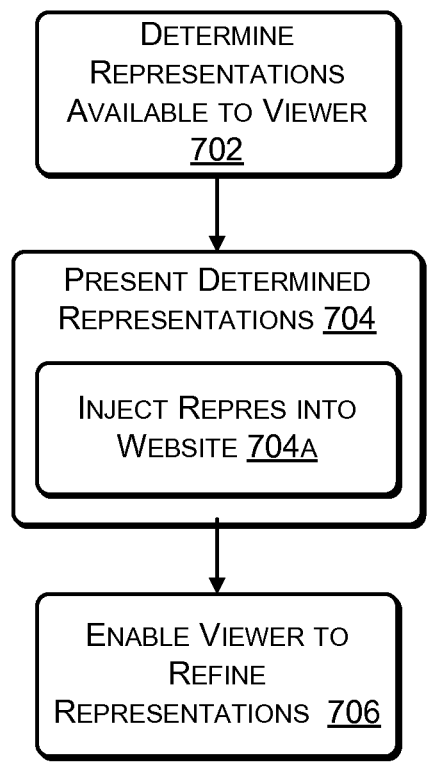
FIG. 7 is a flowchart showing an illustrative process for determining available representations of transparency metrics based on descriptors of a viewer of those representations, in accordance with various embodiments.

FIG. 7 is a flowchart showing an illustrative process for determining available representations of transparency metrics based on descriptors of a viewer of those representations, in accordance with various embodiments. At block 702, the accountability provider determines representations of transparency metrics for one or more accountable entities available to a viewer based at least on a viewer address obtained from a data source of one of the accountable entities. The data source may be, for example, a driver's license database. Also, the determining may be further based on vital statistics, educational credentials, a current employer, an employment history, or a security clearance.

At block 704, the accountability provider or accountable entity presents the determined representations responsive to a login from the viewer. At block 704a, the presenting includes injecting the determined representations into a website by embedding a viewer control. The website may be a website of the accountable entity, of the accountability provider, or of another entity or individual. At block 706, the accountability provider or accountable entity enables the viewer to refine the presented representations in order to display a subset of the presented representations.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

We claim:
1. A computer-implemented method comprising:
receiving, by one more computing devices, at least one transparency goal associated with an accountable entity, the at least one transparency goal corresponding to a performance measure that relates to the accountable entity;
receiving, by the one or more computing devices, one or more data sources from the accountable entity;

performing, by the one or more computing devices, a semantic analysis of the one or more data sources to identify transparency data items that relate to the at least one transparency goal;

performing, by the one or more computing devices, an additional analysis of the at least one transparency goal and the transparency data items to identify transparency metrics, the transparency metrics being key performance indicators associated with the at least one transparency goal;

enabling, by the one or more computing devices, specification of queries utilizing the transparency metrics, the queries being based on an analysis of the at least one transparency goal of the accountable entity; and performing, by the one or more computing devices, the queries on the related data sources to generate representations of the transparency metrics.

2. The computer-implemented method of claim 1, further comprising:

receiving, by the one or more computing devices, identifications of viewer roles; and receiving, by the one or more computing devices, listings of transparency metrics and/or transparency data from the data sources available to viewers based on their viewer roles.

3. The computer-implemented method of claim 1, wherein the analysis of the at least one transparency goals is performed at least in part by analysts associated with an accountability provider.

4. The computer-implemented method of claim 1, wherein the analysis of the at least one transparency goals utilizes one or both of machine learning techniques or comparisons of data source metadata.

5. The computer-implemented method of claim 1, further comprising providing, by the one or more computing devices, transaction data associated with the transparency metrics to the accountable entity for certification by individuals associated with the transaction data.

6. The computer-implemented method of claim 1, wherein enabling specification of the queries comprises automatically specifying the queries based on the analysis of the at least one transparency goal.

7. The computer-implemented method of claim 1, further comprising, performing consistency checks of the transparency data by parsing, verifying and reconciling the transparency data for errors.

8. One or more non-transitory computer-readable storage media comprising computer-executable instructions stored thereon and configured to program one or more computing devices to perform operations including:

accessing one or more data sources and at least one transparency goal associated with an accountable entity;

performing a semantic analysis of the one or more data sources to identify transparency data items that relate to the least one transparency goal;

performing an additional analysis of the least one transparency goal and transparency data items to identify data items that relate to transparency metrics, the transparency metrics being key performance indicators associated with the at least one transparency goal;

presenting one or more representations of the transparency metrics and the at least on transparency goal for the accountable entity based at least on a viewer role;

enabling interaction with the one or more representations to obtain views of the transparency data items associated with the at least one transparency goal and the transparency metrics; and updating the one or more representations based on one or both of viewer interactions and viewer requests.

9. The one or more non-transitory computer-readable storage media of claim 8, wherein the operations further include receiving login credentials from a viewer and performing the presenting and enabling interaction based on the viewer role of the viewer.

10. The one or more non-transitory computer-readable storage media of claim 8, wherein the enabled interaction includes at least one of switching between different representations of transparency metrics, viewing an additional level of detail associated with a transparency metric, or viewing an audit trail for a certified transaction associated with a transparency metric.

11. The one or more non-transitory computer-readable storage media of claim 8, wherein the representations include graphs, charts, grids, gauges, and maps and are presented via a dashboard user interface.

12. The one or more non-transitory computer-readable storage media of claim 8, wherein the one or more representations of the transparency metrics include one or both of representations of historical data or representations of real time data.

13. The one or more non-transitory computer-readable storage media of claim 8, wherein the operations further include providing alerts when thresholds associated with transparency metrics are not met or are exceeded.

14. The one or more non-transitory computer-readable storage media of claim 8, wherein the updating comprises generating new representations or modifying existing representations.

15. The one or more non-transitory computer-readable storage media of claim 14, wherein the updating based on viewer interactions comprises updating based on explicit feedback regarding the representations or updating based on utilization of the representations.

16. The one or more non-transitory computer-readable storage media of claim 14, wherein the updating based on viewer interactions comprises predicting one or more transparency metrics given a target transparency metric provided by the viewer.

17. A system comprising:
one or more processors; and
a transparency portal module configured to be operated by the one or more processors to perform operations including:
receiving one or more data sources from one or more accountable entities;
performing a semantic analysis of the one or more data sources to identify transparency data items that related to at least one transparency goal;
performing an additional analysis of the at least one transparency goal and the transparency data items to identify transparency metrics, the transparency metrics being key performance indicators associated with the at least one transparency goal;
identifying transaction participants based at least in part on the transparency data items, wherein the transaction participants correspond to individuals allowed access to representations of transparency data items;
receiving a viewer login to access representations of the transparency metrics for the one or more accountable entities;
determining that viewer descriptors associated with the viewer login correspond with a transaction participant of the transaction participants that is allowed access to the representations of the transparency metrics;

determining the representations of the transparency metrics available to the viewer login based at least in part on the determined viewer descriptors; and presenting the determined representations responsive to the viewer login.

18. The system of claim 17, wherein the presenting includes injecting the determined representations into a website by embedding a viewer control.

19. The system of claim 17, wherein viewer descriptors are further based on vital statistics, educational credentials, a current employer, an employment history, or a security clearance.

20. The system of claim 17, wherein the transparency portal module enables the viewer to refine the determined representations in order to display a subset of the determined representations.

* * * * *